STATIC MEMORY SYSTEM

Filed Sept. 6, 1952

2 Sheets-Sheet 1

FIG. I

INVENTOR
LYLE G. THOMPSON
BY
Fidler, Crouse & Beardsley
ATTORNEY

INVENTOR
LYLE G. THOMPSON
BY
Fidler, Crouse & Beardsley
ATTORNEY

United States Patent Office 3,104,378
Patented Sept. 17, 1963

3,104,378
STATIC MEMORY SYSTEM
Lyle Glen Thompson, Primos, Pa., assignor to Burroughs Corporation, Detroit, Mich., a corporation of Michigan
Filed Sept. 6, 1952, Ser. No. 308,183
36 Claims. (Cl. 340—174)

This invention relates generally to memory systems and more particularly to a system comprising storage devices wherein the non-linear magnetic characteristics of magnetic materials are utilized to effect the storage.

Due to increasing demands for rapid solutions to complex problems arising in many fields such as statistics, engineering, nuclear physics, accounting, and many others, a great deal of effort has been expended by research and development groups to advance the art of computing machinery. Almost every computing machine requires a storage or memory system for storing information. An ideal storage or memory system should have a rapid information entry time, a rapid information extraction time, the ability to hold information over periods ranging from a very short period of time to a very long period of time and even during a power failure or shut down of the machine, stability of operating characteristics with age and use, minimum of maintenance, compactness, and it should be comparatively inexpensive.

There are several types of memory storage devices known in the prior art, such as, for example, systems of relays, magnetic drums, magnetic tapes, punched tapes and cards, cathode ray devices commonly referred to as memory tubes, mercury delay lines, and electronic memory devices composed either of gas tubes or vacuum tubes. Each of the above enumerated types of memory devices possesses certain of the above mentioned desirable characteristics, but none of them possesses all of these desirable characteristics. For example, memory devices which include physically moving parts such as punched tapes and cards, electromagnetic relay types of storage devices, and magnetic drums present maintenance problems due to wear, and, furthermore, the mass of the moving parts of such devices unduly increase the information entry time and the information extraction time. Systems utilizing electronic discharge devices such as gas tubes or vacuum tubes, for example, are quite rapid in operation, but have operating characteristics which change considerably with age and use and require a continuing application of power in order to retain the information stored therein. In addition, memory systems utilizing electron discharge devices are relatively expensive and require a considerable amount of maintenance. Mercury delay lines are also quite expensive, occupy a good deal of space, and will not retain information for an indefinite length of time. A fast, reliable storage or memory system of a compact design requiring a minimum amount of maintenance and having storage characteristics substantially unchanging with wear and age and being capable of retaining stored information during shut downs of the machine or if the power supply should fail would mark a definite improvement in the computing machine field, particularly in the information storage field.

An object of the present invention is to provide a high speed information storage system having no moving parts.

Another object of the invention is to provide a novel magnetic memory system utilizing a small number of electron discharge devices.

Another object of the invention is to provide an information storage system whose operating characteristics will remain substantially unchanged regardless of the length of time used and the amount of usage.

Another object is to provide a storage device utilizing bi-state impedances such as magnetic storage elements capable of retaining information stored therein independently of applied power.

Another object of the invention is to provide a high speed reliable storage system requiring a minimum amount of maintenance.

Still another object is to provide a novel and simple high speed memory device wherein the storage and read out are effected by static magnetic elements each having a substantially rectangular hysteresis loop and being selectively energized by means of a single winding by electric discharge devices, and which requires a small number of discharge devices as compared with the number of storage elements.

A more specific object of the invention is to provide a novel storage device comprising a plurality of magnetic storage elements each having a substantially rectangular hysteresis loop and provided with a single winding. The elements are arranged in a coordinate array of columns and rows, and selectively operable actuating means connected to the windings are associated with each column and row whereby information may be read into a particular storage element in the array by simultaneously operating the actuating means for that column and that row wherein the particular storage element is located. The device is further provided with a read-out means including actuating means connected to the windings of each column of devices for simultaneously clearing all of the elements of that particular column to cause those elements to produce on outputs individual to each row an indication of the information stored therein and, simultaneously, to clear the elements of that column.

In accordance with one embodiment of the invention a plurality of magnetic cores are arranged in a rectangular coordinate array to form a plurality of rows and a plurality of columns. Associated with the plurality of rows is a plurality of first voltage source means, each of the plurality of first voltage source means being associated individually with one of the rows and adapted to condition the cores of the associated row to subsequently acquire a condition of positive or negative remanence in accordance with the particular bit of information to be stored in this row. A plurality of second voltage source means are adapted to cause a selected column of cores to acquire a positive or negative remanence in accordance with the conditioning of the rows by the plurality of first voltage source means. One each of the plurality of second voltage source means is individual to each of the columns of cores. The operation of the plurality of second voltage source means completes the entry of the information to be stored into a particular column of the storage system. Further associated with the plurality of columns are a plurality of third voltage source means each individual to one of the columns and adapted, when operated, to cause all the cores in the associated column of cores to acquire a remanence of the same given polarity. Only those cores of the selected column whose polarities are reversed by the operation of the associated one of the second plurality of voltage source means will be reversed again by the operation of the associated one of the third plurality of voltage source means. A plurality of fourth means, each individual to one of the rows of cores, is adapted to detect the change of remanence from one polarity to another polarity when a preselected one of the plurality of third voltage source means is operated. It is to be observed that the operation of the third plurality of voltage source means not only causes extraction of information from the memory device, but further is utilized to clear the cores of the associated columns for a subsequent information entry operation. It is possible to reenter the extracted information into the memory device by means of well known external circuitry such as a series of flip-flop circuits, one individual to each row, having complementing circuitry associated therewith.

In carrying out the invention each core is provided with a single magnetizing winding. Information is entered into a particular column of cores by impressing a potential, in accordance with the information to be entered, on a first terminal of each of the windings and then causing the other terminal of each of the windings in the particular column to assume a given potential so that current will flow only through preselected windings in a given column. A plurality of resistances connect individually the first terminal of the windings of a given column to the third voltage source means associated with this column. If then an information extraction voltage pulse is applied by a selected one of the third voltage source means, a current is caused to flow through each of the resistances and the associated winding of the associated column. However, only certain of these windings of the associated column will have a polarity of the magnetic remanences reversed. Consequently, the voltage appearing at the first terminal of the windings in the selected column will be different depending on whether or not the remanence of the associated core is being reversed by the current flow therethrough. A potential developed at any of the first terminals is detected by well known means.

These and other objects and advantages of the present invention will be more fully understood from the following detailed description of an illustrative embodiment thereof taken together with the accompanying drawings, wherein.

Figure 1:
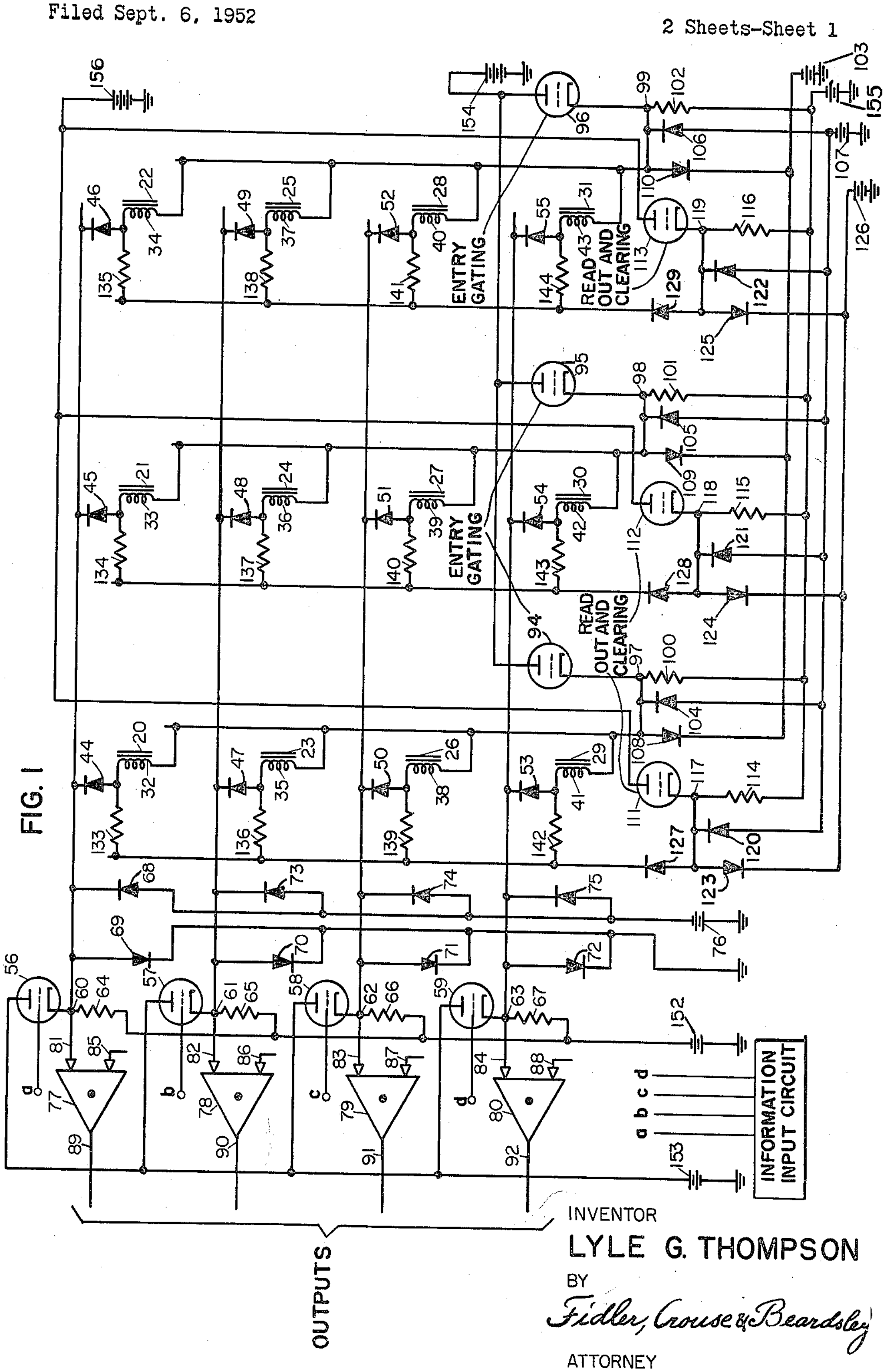
FIG. 1 is a schematic circuit diagram of one embodiment of the invention.

Referring now to the schematic circuit diagram of FIG. 1, the invention is shown as comprising a plurality of magnetic storage devices arranged in a coordinate array of rows and columns. The cores of these magnetic devices are preferably made from a magnetic material, commonly referred to as rectangular hysteresis loop material, which is characterized by having a high residual flux density and having a ratio of remanence flux density to saturation flux density which approaches unity. Many types of nickel-iron alloys have such characteristics when properly cold rolled and heat treated, and the magnetic material known as "Orthonic" manufactured by Magnetic Materials Company, Camden, New Jersey, is particularly well suited for the present invention.

There are shown by way of example 12 magnetic storage devices in FIG. 1 arranged in four rows of three devices in each and in three columns of four devices in each, the rows being designated as being horizontal as viewed in the drawing and the columns as being vertical. Storage devices 20, 21 and 22 make up the first row, devices 23, 24 and 25 the second row, devices 26, 27 and 28 the third row, and devices 29, 30 and 31 the last or bottom row.

Each of the storage devices 20 to 31 comprises a single winding 32 to 43, respectively, wound on the core thereof. In the preferred embodiment to be described herein each of the windings may be composed of 625 turns of #35 A.W.G. copper wire.

Each of the magnetic cores of the storage devices will, after having been magnetized substantially to its saturation point in either direction by a magnetizing current flowing through its winding, have a residual flux therein only slightly less than the saturation flux when the magnetizing current is cut off, and the core will remain in this magnetic state until a reversing magnetizing current is caused to flow through its winding in the opposite direction. By designating each of the two polarities of residual flux in the cores as representing one of the two binary digits of "0" and "1", each magnetic device may be utilized to store information in a binary form. Thus by assigning each column of devices collectively to form a word in a binary code, the storage system illustrated in FIG. 1 will have a capacity to store simultaneously three four-digit binary words. By increasing the rows and columns this capacity may, of course, be increased as desired. In the embodiment described herein four-digit binary words or numbers may suitably be stored in the respective columns with the arithmetically least important binary digits stored in the top row of storage devices, i.e., in one of the devices 20, 21 and 22, and the arithmetically most important digits being stored in the corresponding one of the devices 29, 30 and 31, in the bottom row.

In the storage system shown in FIG. 1 there is provided one vacuum tube connected in a cathode follower circuit for each column of magnetic devices for the purpose of preparing or conditioning all of the devices in a selected column for accepting binary information and one vacuum tube connected in a cathode follower circuit for each row of devices for imparting binary information to the device in that row, which lies in a selected column. These tubes are shown as being of the triode type having a plate, a cathode and a control grid.

Each of the windings 32 to 43 of the magnetic devices 20 to 31 has one terminal thereof connected to the output terminal of the cathode follower circuit associated with that row through asymmetrical devices 44 to 55, respectively, which are provided for the purpose of isolating the devices from each other. The cathode follower circuits associated with the respective four rows of storage devices comprise, respectively, vacuum tubes 56 to 59 having the cathodes thereof connected directly to respective output terminals 60 to 63 and cathode load resistors 64 to 67.

In order to limit the voltages of the output terminals to certain predetermined maximum and minimum values suitable for operating the storage system, which the tubes are capable of providing even when their emission has fallen off by an appreciable amount, each terminal is connected to an upper and a lower source of limiting potential through respective ones of a pair of asymmetrical devices. Thus for output terminal 60, for example, there is provided an asymmetrical device 68 connected so as to conduct current when the potential of this terminal tends to fall below the potential of the source to which this asymmetrical device is connected, and an asymmetrical device 69 connected so as to conduct current when the potential of the terminal tends to rise above the potential to which this latter asymmetrical device is connected. Similarly, output terminals 61 to 63 are connected, by means of asymmetrical devices 70 to 72, respectively, to the source of upper limiting potential, in the present illustrative example ground potential, and by means of asymmetrical devices 73 to 75, respectively, to a source of lower limiting potential, namely the negative terminal of a D.C. source 76.

Gate circuits generally indicated at 77, 78, 79 and 80 are provided for the respective rows to serve as output circuits for the magnetic storage devices located therein. Each gate circuit has a signal input lead connected to the output terminal of the cathode follower circuit of the associated row of magnetic storage devices and a lead to which the gating pulse is applied from a source of timing pulses (not shown) to produce an output signal in accordance with the potential of the output terminal of the associated cathode follower circuit. Thus gate circuits 77 to 80 are provided, respectively, with signal input leads 81 to 84 connected to the cathode follower terminals 60 to 63, respectively, and gating signal leads 85 to 88. The output leads from the gate circuits are designated, respectively, with reference numbers 89 to 92.

The cathode follower circuits associated with the respective three columns of storage devices comprise, respectively, vacuum tubes 94 to 96 having the cathodes thereof connected directly to respective output terminals 97 to 99 and cathode resistors 100 to 102. The negative voltage swing of terminals 97 to 99 is limited by means of respective asymmetrical devices 104 to 106 to the potential of the negative terminal of source 107 and the positive voltage swing is limited to the potential of the negative terminal of source 103 by means of respective asymmetrical devices 108 to 110 in the manner described above in connection with the voltage limiting means for terminals 60 to 63.

Vacuum tubes 111 to 113 are provided for the respective columns of magnetic storage devices for extracting information from the storage devices in a selected column and for simultaneously clearing these devices, i.e. causing them to assume an initial magnetic state. Tubes 111 to 113 are connected in cathode follower circuits and have, respectively, cathode resistors 114 to 116 thereof connected to a negative source of D.C. potential. The output terminals 117 to 119 of the respective cathode follower circuits are located at the junction between the cathodes and associated cathode resistors. Asymmetrical devices 120 to 122 are connected between the negative terminal of D.C. source 107 and respective ones of terminals 117 to 119 to limit the negative voltage swing of these terminals and, similarly, asymmetrical devices 123 to 125 are connected between respective ones of terminals 117 to 119 and the positive terminal of D.C. source 126 to limit the positive voltage swing thereof.

Terminals 117 to 119 are connected by means of respective asymmetrical devices 127 to 129 to that terminal of each of windings 32 to 43 in the associated column which is connected to one of the terminals 60 to 63 of tubes 56 to 59, through individual resistors 133 to 144, respectively.

Although a wide range in values of the components shown in FIG. 1 and of operating characteristics of the circuit may be used to suit particular requirements a set of values employed in an operative embodiment will be mentioned for the sake of illustration. All the three electrode vacuum tubes shown may be of the type 5687 manufactured by Tung Sol Electric Company of New Jersey. Tubes 56 to 59 may have the cathode resistors thereof connected to a common negative 105 volt D.C. source 152 and the plate electrodes thereof connected to a common positive 105 volt D.C. source 153, in which case the cathode resistors 64 to 67 may each have a resistance of 28,000 ohms. Using the tubes, cathode resistors and the operating voltages mentioned, the terminals 60 to 63 will tend to assume a voltage considerably more negative than negative 15 volts with no signal applied to the control grids thereof and substantially more positive than ground potential when a positive signal is applied thereto. The range of the control voltages may suitably be 15 volts in which case source 76 should have a potential of 15 volts negative.

Tubes 94 to 96 associated with the respective columns of devices for causing the devices in a selected column to accept information in accordance with the conditioning thereof by tubes 56 to 59 may have the plate electrodes thereof connected to a common 105 volts D.C. source 154 and the cathode resistors 100 to 102 thereof, which each may suitably have a resistance of 5,000 ohms, connected to a common 105 volt negative source of D.C. potential 155. Terminals 97 to 99 of tubes 94 and 96 will under these conditions tend to assume a potential considerably more negative than 15 volts negative when no signal is applied to the control grids thereof. With the lower limit potential of terminals 60 to 63 set at 15 volts negative, source 107 may suitably be at 15 volts negative also. It may be desirable to have potential source 107 one or two volts more negative than potential source 76 to avoid current leakage during periods of inoperation. The upper limit potential of terminals 97 to 99 should not be more positive than that of terminals 60 to 63 but preferably slightly more negative. Source 103 may therefore suitably have a potential of about 2 volts negative.

Read-out and clearing tubes 111 to 113 may have the plates thereof connected to a common 105 volts positive source 156 and the cathode resistors 114 to 116 connected to a negative 105 volts source 155. Resistors 114 to 116 may each have a resistance of 47,000 ohms. The range of potentials on terminals 117 to 119 may suitably be limited to about 15 volts positive by means of positive 15 volt source 126 and to about 15 volts negative by means of negative 15 volts source 107.

By reason of the above described circuitry and the voltages of the various sources by which the tubes tend to provide substantially larger ranges of control potentials than those needed for proper operation, the tubes are capable of providing the required control voltages even when the emission thereof has fallen off by an appreciable amount due to ageing, for example, and will thus have a much longer life.

Resistors 133 to 144 may suitably have a resistance of about 800 ohms. The asymmetrical devices shown may be germanium crystal diodes of a type readily available on the market and having about 100 ohms forward impedance and about 50,000 back impedance.

The system described above is particularly suitable for accepting binary information, for storing such information indefinitely in the magnetic storage devices and for reading out the information to the gate circuits when desired. It will be evident that the coordinate system shown by way of example herein may be expanded so as to store binary items having any number of digits and to store any number of different items of information within the physical limits of the components used. It will be evident also that although the system is shown and described as an array of rows and columns, it is to be understood that this designation is chosen merely to facilitate an explanation of the electrical interconnection of the storage elements and does not intend to limit the invention to any particular physical arrangement.

It is well known that practically every kind of information may be expressed in a binary code but for the sake of illustration it will be assumed that it is desired to store a four-digit binary number. Each of the rows of the coordinate array is assigned to one of the orders of the number and in the present illustration it will be assumed that the rows are assigned to the respective orders of a binary number in accordance with their increasing arithmetical significance from top toward bottom. Thus the signals representing the binary digits of the least arithmetical significance will be applied, in the form of voltage pulses, to the control grid of tube 56, and the signals representing the digits of increasing significance to successive ones of the control grids of tubes 57, 58, and 59.

For the sake of illustration it will be assumed that the application of a positive voltage pulse to the control grids of tubes 56 to 59 will represent the binary digit "0" and the absence of a positive voltage pulse will represent the binary digit "1." From the above description of the cathode follower circuits comprising these tubes and the voltage limiting circuits associated with the output terminals thereof, it will be evident that such terminals will be at a potential determined by source 76, i.e., 15 volts negative in the above described embodiment when a binary digit "1" in the form of the absence of a positive pulse is imparted to the control grid of the associated tube but will rise to ground potential when a binary digit "0" in the form of a positive voltage pulse is imparted to the control grid of the associated tube.

It was mentioned above that the cores of the magnetic storage devices are made of a magnetic material having a high remanence flux to saturation flux ratio and this property of the material is utilized to store binary information in the devices. Thus residual magnetism of one polarity is taken to represent one binary digit and residual magnetism of the other polarity to represent the other binary digit.

In the following description of the operation of the system illustrated it will be assumed that the current which will flow through the windings when the lower terminal thereof is more positive than the upper terminal will establish a positive flux in the associated core to represent a stored binary digit "1," and, reversely, that current flowing in the opposite direction through the winding will establish a negative flux in the associated core to represent a stored binary digit "0."

In general, when information in the form of a binary number is to be entered in a cleared one of the columns of storage devices, the voltage pulses corresponding to such information are applied to the respective control grids of tubes 56 to 59, and, within the duration of these pulses, an entry pulse is applied to the control grid of the one of tubes 94 to 96 which is associated with the column wherein it is desired to enter the information. This will cause current to flow through the energizing winding of the storage devices which are located in the selected column and which are also located in a row whose associated tube is impressed with binary information representing a "1," i.e., the absence of an applied voltage pulse, in such a direction and of such magnitude as to magnetize the cores thereof substantially to saturation in a positive sense. When the entry pulse is terminated, the cores of the storage devices in the selected column will have stored therein in the form of maximum residual magnetism of one polarity or the other, the information applied to tubes 56 to 59.

The information is extracted from storage and applied to gate circuits 77 to 80 by applying a positive pulse to the control grid of the one of the tubes 111 to 113 which is associated with the column from which the information is to be extracted, and the information will appear at the outputs of the gate circuits when a gating pulse is applied to leads 85 to 88. Simultaneously with extracting the information, this operation also clears the storage devices of this column, i.e., causes the cores of all of the devices in this column to become magnetized in a negative sense so as to be in condition to accept a new item of information.

The manner in which the circuit functions to provide the results stated above will now be described in detail in terms of the entry of information in the form of a binary digit "1" and of a binary digit "0" into separate storage devices located in a common column and the subsequent extraction of such information therefrom.

Figures 2, 3, 4, 5, 6, 7, 8:
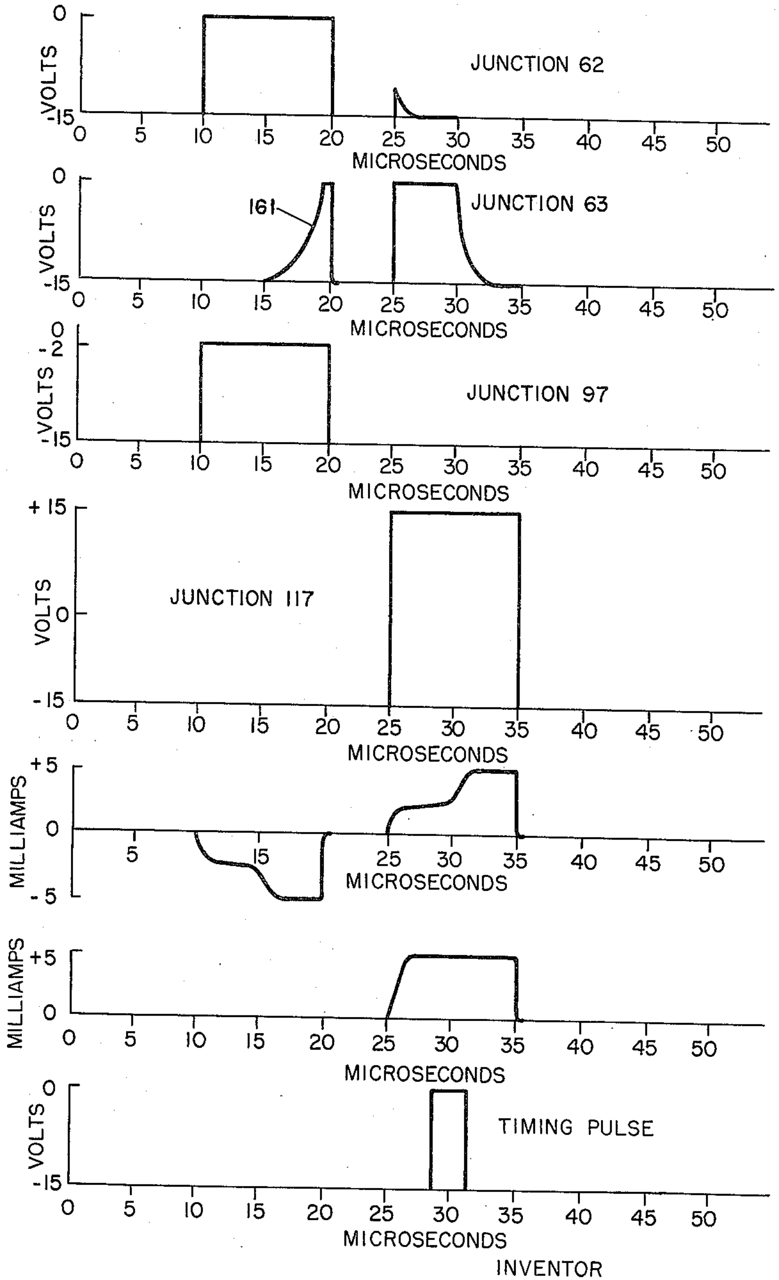
FIGS. 2 and 3 show respectively the voltage-time relationship at a certain point in the circuit when two different information pulses are entered into a storage device and when the information is extracted therefrom.
FIG. 4 shows the voltage-time relationship of a read-in voltage pulse.
FIG. 5 shows the voltage-time relationship of an extraction voltage pulse.
FIG. 6 shows the winding current pulses necessary to read information from a core having remanence of a first polarity.
FIG. 7 shows the winding current necessary to read out information from a core having a remanence of a second polarity.
FIG. 8 shows a timing pulse.

Assume, for example, that it is desired to store a binary digit "1" in the storage device 29 and that the signal pulse representing this information is applied to the grid of tube 59 at time 10 microseconds. It will be recalled that a binary digit "1" is represented by the absence of a signal voltage pulse and the potential at terminal or junction 63 will therefore remain at negative 15 volts at time 10 microseconds as shown in FIG. 3. Simultaneously with the application of the information pulse to the control grid of tube 59, an entry pulse is applied to the grid of tube 94, associated with the column wherein device 29 is located, causing the terminal or junction 97 to rise from a negative 15 volts to a negative 2 volts as shown at time 10 microseconds in FIG. 4. It will thus be seen that at time 10 microsecond and until 20 microsecond when the entry pulse is terminated the potential of terminal 97 will be at a negative 2 volts and, during at least the initial portion of this time, the potential of terminal 63 will be at negative 15 volts. This will cause a current to flow from terminal 97 through a circuit which may be traced through winding 41 of device 29, asymmetrical device 53, terminal 63, cathode resistance 67 to the negative source of potential 152 to magnetize the core of device 29 to saturation in a positive sense. It will be noted from the curve 161 in FIG. 3 that with the particular core material used and the number of turns in the magnetizing windings as stated, it takes almost 10 microseconds for the core to become positively saturated. As the magnetization of the core of magnetic device 29 approaches saturation, the impedance presented by winding 41 will be reduced to a point where a sufficient amount of current will flow therethrough and through resistance 67 to raise the potential of terminal 63 to its upper limit of ground potential before the entry signal voltage pulse is terminated at time 20 microseconds as shown in FIG. 4. The core of device 29 is now in a state of maximum positive residual magnetization representing a stored binary digit "1."

Assume that it is desired to enter at the same time, a binary digit "0" in storage device 26. A signal voltage pulse representing the binary digit "0" is applied to the control grid of tube 58 to raise the potential of terminal 62 from its lower limit potential of 15 volts negative to its upper limit of ground potential. As before, it will be assumed that this signal voltage pulse is applied at time 10 microseconds and that it is of 10 microseconds duration and its effect upon the potential of terminal 62 is illustrated in FIG. 2. As explained above in describing the entry of a digit "1" in storage device 29, the entry signal pulse is applied to the grid of tube 94 at substantially the same time to raise the potential of terminal 97 to its upper limit potential of 2 volts negative as illustrated in FIG. 4. Referring to FIG. 1, it will be seen that with terminal 97 of tube 94 at a potential of 2 volts negative and terminal 62 of tube 58 at ground potential, no current will flow through winding 38 of storage device 26 which therefore will remain in its initial state of maximum negative residual magnetism representing a stored binary digit "0" as required.

At time 20 microseconds therefore a binary digit "1" will be stored in device 29 and a digit "0" in device 26. It will be understood, of course, that binary digits "1" or "0" as required are simultaneously stored in storage devices 20 and 23 of the same column if it is desired to store information in the form of a four-digit binary word.

The information is extracted simultaneously from all of the devices 20, 23, 26 and 29 by applying a positive extraction or read-out pulse to the grid of tube 111 of sufficient amplitude to raise the potential of terminal 117 thereof to its upper limit potential of 15 volts positive and for a duration sufficient to insure that all of the devices which have had a binary digit "1" stored therein and have thus been caused to assume a state of maximum positive residual magnetism now become substantially saturated in a negative sense.

Generally speaking the information being extracted is applied to the respective gates 77 to 80 by causing the potential of the terminals 60 to 63 of the tubes associated with the devices which have a binary digit "1" stored therein to raise to ground potential, the terminals of the tubes associated with the devices which have a binary digit "0" stored therein remaining at their quiescent 15 volts negative potential.

In the case of storage device 29 wherein a digit "1" is stored, winding 41 thereof will offer a comparatively large impedance to current flow while the magnetization is being reversed and will cause a sufficient amount of current to pass through asymmetrical device 53 and resistance 67 to raise the potential of terminal 63 to its upper limit of ground potential. The effect of the extraction pulse applied at time 25 microsceonds to the grid of tube 111 on the voltage of terminal 117 is illustrated in FIG. 5. Thus at time 25 microseconds the potential of terminal 117 will be at 15 volts positive and will cause a current to flow through asymmetrical device 127, resistance 142, asymmetrical device 53, cathode resistance 67 to 105 volts negative source 152 to raise the potential of terminal 63 from 15 volts negative to its upper limit potential of 0 volts as indicated in FIG. 3 at time 25 microseconds. As pointed out above, by reason of the core of device 29 being in a state of maximum positive residual magnetism, winding 41 thereof will offer substantial impedance to current flow, but as the potential of terminal 97 is at its lower limiting potential of 15 volts negative while the upper terminal of winding 41 is at substantially the potential of terminal 63, namely ground potential, sufficient current will flow through this winding and through resistance 100 to 105 volt negative source 155 to reverse the magnetism in the core of device 29. It will be recalled that the cathode follower circuit of tube 94 is designed so as to tend to establish a potential on terminal 97 substantially more negative than 15 volts negative but that the voltage of this terminal is kept at this potential by the limiting action of asymmetrical device 104 connecting it to the 15 volts negative source 107. The current flowing through winding 41 and resistance 100, is insufficient to raise the voltage of terminal 97 appreciably above this potential even after the magnetism in the core of device 29 has been reversed to its saturation level in a negative sense so that at no time during the information extraction and clearing operation does the potential on terminal 97 rise significantly above the 15 volts negative level. However, as the magnetism in this core approaches negative saturation the impedance of winding 41 decreases so that at about time 33 microseconds, an amount of current will flow therethrough to increase the voltage drop across resistance 142 to a point where the current flow through cathode resistance 67 of tube 59 will be insufficient to maintain the potential of terminal 63 above its lower limit potential of negative 15 volts established by source 76 as shown in FIG. 3. The current flow through a winding during the period of entering a binary digit "1" into the associated storage device and the period of extracting the digit "1" therefrom is illustrated in FIG. 6.

It was pointed out above that the circuit is designed so that when the storage devices are magnetized in a negative sense and the windings thereof offer little impedance, the current flow from terminal 117 through asymmetrical device 127, resistance 142 and the parallel paths comprising, respectively, asymmetrical device 53 and resistance 67 to 105 volts negative source 152, and winding 41 and cathode resistances 100 to 105 volts negative source 155 will be insufficient to raise the potential of either one of the terminals 63 and 97 above its lower limit potential of 15 volts negative. Therefore, with a binary digit "0" stored in device 26, the winding 38 thereof will offer little impedance to current flow and terminal 62 will remain at 15 volts negative except for a short period of time when the magnetism in the core of device 26 is changed from a maximum negative residual state to a substantially saturated negative state during which time the winding thereof will offer sufficient impedance to produce a slight increase in voltage on terminal 62 between time 25 microseconds and time 27 microseconds as indicated in FIG. 2. The current flow through winding 38 during the extraction of a binary digit "0" from the core of storage device 26 is shown in FIG. 7.

It will be seen from FIGS. 2 and 3 that between times 27 microseconds and about 31 microseconds the terminals, such as terminal 63, associated with devices wherein a binary digit "1" was stored will be at about zero potential, while the terminals, such as terminal 62, associated with devices wherein a binary digit "0" was stored will be at a potential of about 15 volts negative.

If timing pulses are applied simultaneously to terminals 87 and 88 of gates 79 and 80, respectively, during this period, signals will be produced on the output terminals 91 and 92 indicating the information stored in the devices 26 and 29, respectively. FIG. 8 shows a suitable timing pulse.

While only a single embodiment of the invention has been described and illustrated, it will be apparent to those skilled in the art that various modifications thereof such as changes in the arrangement and values of the various elements may be made, and the capacity of the memory system may be increased as desired without departing from the spirit and scope of the invention.

I claim:

1. In a memory system comprising a plurality of magnetic devices each having a substantially rectangular hysteresis loop arranged in a coordinate array of rows and columns, each of said devices being adapted to store information by means of the polarity of residual magnetism established therein, a plurality of magnetizing windings, each being coupled inductively to one of said devices for establishing in said one device a residual magnetic storage state, and means electrically connected to said windings for magnetizing selectively said magnetic devices including a signal source electrically connected to said windings of said devices in each row and a signal source connected to said windings of said devices in each column, read-out means for restoring selected ones of said magnetized devices to their cleared state comprising a source of voltage, a resistive impedance electrically connecting said source of voltage to individual ones of said windings of said devices, and output means coupled to said resistive impedances and responsive to the voltage drop across said resistive impedances produced by said source of voltage for indicating the polarity of magnetization of the devices to the windings of which said impedances are electrically connected.

2. In a memory system comprising a plurality of magnetic devices each having a substantially rectangular hysteresis loop arranged in a coordinate array of rows and columns, each column of devices being adapted to represent collectively information in a binary code, each of said devices being adapted to represent the respective binary digits by means of the polarity of residual magnetism established therein, a plurality of magnetizing windings, each being coupled inductively to one of said devices for establishing in said one device a residual magnetic storage state, and means electrically connected to said windings for magnetizing selectively said magnetic devices including a signal source electrically connected to said windings of said devices in each row and a signal source connected to said windings of said devices in each column, read-out and clearing means for devices located in a common column comprising a source of voltage, a resistive impedance electrically connecting said source of voltage to individual ones of said windings of said devices, said resistive impedances having a voltage drop produced thereacross by said source of voltage whose amplitude is dependent upon whether or not the associated device requiring magnetic reversal to assume a cleared state, and means responsive to the voltage drop across said resistive impedance indicating the polarity of magnetization of the devices to the windings of which said impedances are electrically connected.

3. In a memory system comprising a plurality of magnetic devices each having a substantially rectangular hysteresis loop arranged in a coordinate array of rows and columns, each column of devices being adapted to represent collectively information in a binary code, each of said devices being adapted to represent the respective binary digits by means of the polarity of magnetic remanence established therein, individual energizing windings for storing in each device, a plurality of conditioning means each individually associated with each column of devices and electrically connected to one terminal of the windings of said column, read-out means associated with each column of devices and electrically connected to the other terminal of said windings of a plurality of devices in the associated column and including means for establishing potentials on such other terminals whose amplitude is dependent upon the polarity of magnetic remanence in the associated core, and means electrically connected to said windings of said devices in each row responsive to said potentials for providing an indication thereof.

4. In a memory system comprising a plurality of magnetic devices each having a substantially rectangular hysteresis loop arranged in a coordinate array of rows and columns, each column of devices being adapted to represent collectively information in a binary code, each of said devices being adapted to represent the respective binary digits by means of the polarity of magnetic remanence established therein, individual energizing windings for storing in each device, output means individual to each row and electrically connected to one terminal of each of said windings of a plurality of devices in the associated row, and conditioning means individually associated with each column of devices and electrically connected to the other terminal of said windings of a plurality of devices in the associated column, read-out means associated with each column of devices and electrically connected to said one terminal of each of said windings of a plurality of devices in the associated column and including means for applying potentials thereto for establishing across said winding a potential drop whose amplitude is dependent upon the polarity of magnetic remanence in the associated core, and means for providing at said output means an indication of such potential drop.

5. Read-out means for a memory system having a plurality of magnetic devices each having a substantially rectangular hysteresis loop arranged in a coordinate array of rows and columns, each of said devices being adapted to represent stored information by means of the polarity of residual magnetism established therein and having a magnetizing winding, and means electrically connected to said windings for magnetizing selectively said magnetic devices including a signal source electrically connected to said windings of the devices in each row and a signal source electrically connected to said windings of the devices in each column, comprising for each column of devices, a further source of voltage, a resistive impedance electrically connecting said source of voltage to individual ones of said windings of devices located in a common column, and means responsive to the voltage drop produced across said resistive impedances by said source of voltage for indicating the polarity of magnetization of the devices to the windings of which said impedances are electrically connected.

6. An information storage means comprising a plurality of magnetic cores each having a substantially rectangular hysteresis loop arranged in a rectangular coordinate array to form a plurality of rows and a plurality of columns, each of said cores having a winding wound thereon, each of said windings having a first terminal and a second terminal, a plurality of first voltage sources associated with respective ones of said rows of cores, each of said sources being electrically connected to said first terminals of said windings of the associated row of cores to apply voltage potentials thereto in accordance with information to be stored, a plurality of second voltage sources associated with respective ones of said columns of cores, each of said second sources being connected to said second terminals of said windings of the associated column of cores to apply a voltage thereto to cause said cores to acquire a magnetic flux saturation of positive or negative polarity in accordance with the potential applied to the said first terminals of said windings by said plurality of first voltage sources, a plurality of third voltage sources associated with respective ones of said columns of cores, each of said third voltage sources being electrically connected to said windings of said cores of the associated column to cause all the cores in such column to acquire a given magnetic remanence, and a resistive impedance electrically connected in circuit with each of said windings and said third voltage source.

7. An information storage means in accordance with claim 6 in which each of said plurality of first voltage sources is adapted to selectively assume a first potential or a second potential, in which each of said plurality of second voltage sources is adapted to selectively assume said first potential or a third potential, and in which each of said plurality of third voltage sources is adapted to selectively assume said first potential or a fourth potential, said fourth potential being more positive than said second potential, said second potential being more positive than said third potential, and said third potential being more positive than said first potential.

8. An information storage means in accordance with claim 6 in which each of said plurality of first voltage sources is adapted to selectively assume a first potential or a second potential, in which each of said plurality of second voltage sources is adapted to selectively assume said first potential or a third potential, and in which each of said plurality of third voltage sources is adapted to selectively assume said first potential or a fourth potential, said fourth potential being more positive than said second potential, said second potential being more positive than said third potential, and said third potential being more positive than said first potential, and in which said resistive impedances are of such value that the current flowing from one of said third voltage sources at said fourth potential to one of said first voltage sources is sufficient to raise the potential of said first terminal of said winding of the associated coordinate to substantially the value of said second potential when the remanence of the core located at the associated coordinate is of such a polarity as to be reversed by a current flow through the associated winding from said third voltage source to said second voltage source, but insufficient to raise the potential of said first terminal a substantial amount when the remanence of the core located at the associated coordinate is of such a polarity as to not be reversed by a current flow from said third means to said second means.

9. An information storage means in accordance with claim 6 in which each of said plurality of first voltage sources is adapted to selectively assume a first potential or a second potential, in which each of said plurality of second voltage sources is adapted to selectively assume said first potential or substantially said second potential, and in which each of said plurality of third voltage sources is adapted to selectively assume said first potential or a third potential, said third potential being more positive than said second potential, and said second potential being more positive than said first potential.

10. An information storage means in accordance with claim 6 in which each of said plurality of first voltage sources is adapted to selectively assume a first potential or a second potential, in which each of said plurality of second voltage sources is adapted to selectively assume said first potential or substantially said second potential, and in which each of said plurality of third voltage sources is adapted to selectively assume said first potential or a third potential, said third potential being more positive than said second potential, and said second potential being more positive than said first potential, and in which said resistive impedances are so selected that the current flowing from one of said third voltage sources at said third potential to one of said first voltage sources is sufficient to raise the potential of said first terminal of the winding of the associated coordinate to substantially the value of said second potential when the remanence of the core located at the associated coordinate is of such a polarity as to be reversed by a current flowing through the associated winding from the said third voltage source to said second means, but insufficient to raise the potential of said first terminal a substantial amount when the remanence of the core located at the associated coordinate is of such a polarity as not to be reversed by a current flowing from said third source to said second source.

11. An information storage means in accordance with claim 6 which further comprises a plurality of asymmetrical conducting devices, each of said asymmetrical conducting devices electrically connecting the first terminal of one of said windings to the associated one of said plurality of first voltage sources.

12. An information storage means comprising a plurality of magnetic cores each having a substantially rectangular hysteresis loop arranged in a rectangular coordinate array of rows and columns, each of said cores having winding coupled thereto, each of said windings being adapted when energized to selectively cause the associated core to become positively or negatively saturated with magnetic flux, a plurality of information voltage sources each individually associated with said rows and electrically connected to said windings of the cores therein and adapted to selectively condition each row of cores to acquire a positive or a negative remanence in accordance with the information to be stored, a plurality of gating voltage sources each individually associated with one of said columns and electrically connected to said windings of said cores thereof and adapted to cause the cores of the associated column to acquire a positive or negative remanence in accordance with the information to be stored, and a plurality of read out voltage sources each individually associated with one of said columns and electrically connected to said windings of the cores therein and adapted to cause all the cores of the associated column to acquire a remanence of the same polarity.

13. An information storage means in accordance with claim 12 in which information and gating voltage sources comprise cathode follower circuits, each of said cathode follower circuits comprising an electron discharge device and a resistive element, each of said electron discharge devices comprising a cathode, said resistive element being electrically connected to said cathode, a plurality of first asymmetrical conducting devices individually electrically connected with each of said cathode follower circuits and adapted to establish an upper potential limit for the said cathodes, a plurality of second asymmetrical conducting devices individually connected electrically to each of said cathode follower circuits and adapted to establish a lower potential limit for the said cathodes, and in which each of said plurality of read out sources is adapted to selectively assume a first potential or a second potential, the values of potentials of said cathodes and said resistive elements being so arranged that when an electric current flows from one of said read out sources to one of said information voltage sources and to the associated one of said gating voltage sources, the potential of the cathode of said second means will rise to its upper potential limit when the polarity of the remanence of the core of the associated coordinate is such as to be caused to be reversed by the said current but will remain at its lower potential limit when the remanence of the core of the associated coordinate is of such a polarity as not to be reversed by said current.

14. An information storage means comprising a plurality of magnetic cores each having a substantially rectangular hysteresis loop arranged in a rectangular coordinate array to form a plurality of rows and a plurality of columns, each of said cores having a winding wound thereon, each of said windings having a first terminal and a second terminal, a plurality of conditioning means each individually electrically connected to said windings of said cores of one of said plurality of rows and adapted to selectively condition each of said rows of cores to have a remanence of a positive polarity or a negative polarity, a plurality of asymmetrical conducting devices individually associated with each of said cores, each of said asymmetrical electrically conducting devices connecting the said first terminal of the associated winding to the associated conditioning means in such a manner that the anode of each of said asymmetrical conducting devices is electrically connected to the said first terminal of the associated winding, a plurality of gating means each individually electrically connected to said windings of said cores of one of said plurality of columns of cores and adapted to cause the cores in a selected column to acquire a remanence in accordance with the conditioning of said cores caused by said plurality of first means, each of said second terminals of said windings being electrically connected to the associated one of said plurality of gating means, a plurality of read out means each individually electrically connected to said windings of said cores of one of said plurality of columns of cores and operable to cause all the cores in a selected column to acquire a remanence of the same polarity, a plurality of resistances each individually electrically connecting said first terminal of each of said windings to the associated one of said read out means, each of said resistances and its associated winding forming a voltage divider with the impedance of said associated winding varying in accordance with the rate of change of magnetic flux in the associated core to produce different detectable voltages on said associated first terminal, and a plurality of detecting means adapted to detect said voltage differences.

15. An information storage means in accordance with claim 14 in which each of said plurality of conditioning means comprises a voltage supply source adapted to selectively assume a first potential or a second potential, in which each of said plurality of gating means comprises a voltage source adapted to selectively assume said first potential or substantially said second potential, and in which each of said read out means is adapted to selectively assume said first potential or a third potential, said third potential being more positive than said second potential, and said second potential being more positive than said first potential.

16. An information storage means in accordance with claim 14 in which each of said plurality of conditioning means comprises a voltage supply source adapted to selectively assume a first potential or a second potential, in which each of said plurality of gating means comprises a voltage source adapted to selectively assume said first potential or substantially said second potential, and in which each of said plurality of read out means is adapted to selectively assume said first potential or a third potential, said third potential being more positive than said second potential, and said second potential being more positive than said first potential, and in which the current flowing from one of said read out means when in said third potential condition to one of said conditioning means is sufficient to raise the potential of said first terminal of said winding of the associated coordinate to substantially the value of said second potential when the remanence of the core located at the associated coordinate is of such a polarity as to be reversed by a current flow through the associated winding from said read out means to the associated gating means, but in which the potential of said first terminal remains substantially that of said first potential when the remanence of the core located at the associated coordinate is of such a polarity as to not be reversed by a current flow from said read out means to said gating means.

17. An information storage means comprising a plurality of magnetic cores each having a substantially rectangular hysteresis loop arranged in a rectangular coordinate array to form a plurality of rows and a plurality of columns, each of said cores having a winding coupled thereto to selectively cause the associated core to become positively or negatively substantially saturated with magnetic flux in accordance with information to be stored, a plurality of conditioning means each individually associated with one of said rows and adapted to selectively condition the windings coupled to the respective rows of cores to become energized to cause the associated row of cores to acquire a positive or negative remanence, a plurality of asymmetrical conducting means individually electrically connecting each of said windings to the associated one of said conditioning means and adapted to prevent electrical current flow of a given polarity from the associated one of said conditioning means to one of said windings, a plurality of gating means each individually electrically connected to the winding coupled to one of the columns of cores and adapted to cause saturation of such column of magnetic cores in accordance with information to be stored, a plurality of read out means each individual to one of the columns of windings, and a plurality of resistive elements, each said resistance element electrically connecting each of the junctions between the plurality of windings and the associated asymmetrical conducting means to the associated read out means.

18. An information storage means in accordance with claim 17 in which each of said plurality of asymmetrical conducting means is an asymmetrical conducting device having its cathode electrically connected to the associated one of said plurality of conditioning means.

19. An information storage device comprising a plurality of electrical junctions arranged in a rectangular coordinate array to form a plurality of rows and a plurality of columns, a plurality of conditioning means, a plurality of asymmetrical conducting devices each individually electrically connecting one of said junctions to one of said conditioning means, a plurality of gating means, a plurality of resistive elements each individually electrically connecting one of said junctions to one of said gating means, a plurality of read-out means each individually associated with one of said columns, a plurality of windings each individually electrically connecting one of said junctions with the associated read-out means, and a plurality of magnetic cores each having a substantially rectangular hysteresis loop, each of said windings being wound around one of said plurality of magnetic cores.

20. An information storage means in accordance with claim 19 in which each of said first voltage means is adapted to assume a first potential or a second potential in accordance with the binary bit code to be stored, in which each of said second voltage means is adapted to assume said first potential or substantially said second potential in accordance with the column in which the information is to be stored, and in which each of said third voltage means is adapted to assume said first potential or a fourth potential in accordance with the column out of which information is to be read.

21. In a memory system comprising a plurality of storage devices capable of assuming bistable remanent states arranged in a coordinate array of rows and columns, and means for selectively causing said devices to assume a desired storage state including a signal source associated with the devices in each row and a signal source associated with the devices in each column for establishing current flow through a path from one of said signal sources to the other, read-out means for said devices comprising a source of voltage, a resistive impedance electrically connecting said source of voltage to said current path of individual ones of said devices, and means responsive to the voltage drop across said resistive impedances indicating the storage state of the devices to which said impedances are electrically connected.

22. In a memory system comprising a plurality of storage devices capable of assuming bistable remanent states arranged in a coordinate array of rows and columns, each column of devices being adapted to represent collectively information in a binary code, and means electrically connected to said devices for selectively causing each of said devices to assume a desired one of its two storage states including a first signal source associated with the devices in each row and a signal source associated with the devices in each column by current flow through a path from one of said signal sources to the other, read-out and clearing means for devices located in a common column comprising a source of voltage, a plurality of resistive impedances individually electrically connecting the current path of individual ones of said devices to said source of voltage, said resistive impedances having a voltage drop thereacross in accordance with whether or not the associated device requires a change of its storage state to assume a cleared storage state, and means responsive to the voltage drop across said resistive impedances indicating the state of impedance of the said devices to which said resistive impedances are electrically connected.

23. In a memory system comprising a plurality of storage devices capable of assuming bistable remanent storage states arranged in a coordinate array of rows and columns, and means for selectively causing said devices to assume a desired storage state including a signal source associated with the devices in each row and a signal source associated with the devices in each column for establishing current flow through a path from a signal source of one column to a signal source of one row, read-out means for said devices comprising a source of D.C. voltage, of a greater potential than any of said signal sources, electrically connected to said current paths at points intermediate said signal sources and output means responsive to the voltage drop across said storage devices to indicate the storage state of devices through which current is flowing from said D.C. source.

24. An information storage means comprising a magnetic core capable of assuming bistable storage states of magnetic remanence, said core having a winding electromagnetically coupled thereto, input core switching means electrically connected to said winding for selectively magnetizing said core either in an initial or in a second of its bistable storage states, read-out core switching means electrically connected to said winding for causing said core to assume its initial bistable storage state, and output circuit means electrically connected to said winding for determining whether or not upon read-out the core switches from its second to its initial bistable storage state.

25. An information storage means as defined in claim 24 wherein said output circuit means includes a gating circuit responsive to the impedance condition of said winding during read-out.

26. An information storage means comprising a magnetic core capable of assuming bistable storage states of magnetic remanence, said core having a winding electromagnetically coupled thereto, input core switching means electrically connected to said winding for selectively magnetizing said core either in an initial or in a second of its bistable storage states, impedance means, read-out core switching means serially connected electrically with said impedance means and said winding for causing said core to assume its initial bistable storage state, and output means coupled to said impedance means and responsive to voltage changes across said impedance means for determining whether or not upon read-out the core switches from its second to its initial bistable storage state.

27. An information storage means comprising a magnetic core capable of assuming bistable storage states of magnetic remanence, said core having a winding electromagnetically coupled thereto, voltage supply means coupled to said winding for selectively magnetizing said core either in an initial or in a second of its bistable storage states, read-out means for causing said core to assume its initial bistable storage state including a voltage source electrically connected to said winding, an impedance means also connected electrically to said winding, and output circuit means electrically connected to said winding for determining whether or not upon read-out the core switches from its second to its initial bistable storage state.

28. An information storage means as defined in claim 27 wherein the voltage source and impedance means of the read-out circuit are serially connected electrically with each other and with said winding.

29. An information storage device comprising a magnetic core capable of assuming bistable storage states of magnetic remanence, a winding coupled to said core; gating means electrically connected to said winding for controlling the flow of current through said winding; first voltage means for applying during a first time period a first voltage across said winding and gating means, in series, for opening said gating means and establishing current flow in one direction through said winding to place said core in one of its two storage states; second voltage means for applying during a second time period a second voltage across said gating means for opening said gating means to permit current flow therethrough and for applying a third voltage across said winding in a direction opposite to that of the first voltage for establishing a current flow in said opposite direction through said winding to switch the core to the other of its storage states; and output means for developing an output signal in response to switching of said core.

30. A memory system comprising a plurality of magnetic cores capable of assuming bistable states of magnetic remanence and having an initial remanent state, said cores being arranged in a coordinate array of rows and columns, a plurality of windings respective ones of which are electromagnetically coupled to respective ones of said magnetic devices, individual gating means electrically connected to each of said windings, first voltage means, coupling means for selectively applying preparatory voltages from said first voltage means to the windings of certain of the rows, second voltage means for applying a voltage signal to the gating means associated with the windings of a selected column for establishing current flow in one direction through certain ones of said column windings, in accordance with the preparatory voltage applied to the rows, for causing the cores associated with said certain windings to assume their second remanent state, read-out means including a third voltage means electrically connected to said windings of a selected column for passing current in an opposite direction through said column windings for causing those cores in said column which are in the second remanent state to revert to their initial remanent state, and individual output means connected electrically to the windings of said selected column for determining whether or not upon read-out each individual core of said selected column reverts from its second to its initial remanent state.

31. An information storage means comprising a plurality of magnetic cores capable of assuming an initial and a second state of magnetic remanence, said cores being arranged in a coordinate array of rows and columns, a plurality of windings respective ones of which are in electromagnetic coupling relation with respective ones of said cores, gating means electrically connected to each of said windings for prohibiting current flow through each said winding, first voltage means for applying a voltage signal to said gating means during various time intervals for permitting current to flow through individual windings during said time intervals, means including second voltage means electrically connected to each of said windings for passing current in one direction through a selected one of said windings during one of said time intervals to cause the cores of such selected windings to assume their second remanent state and for passing a current in the opposite direction through a selected column of said windings during a subsequent time interval to cause those cores of the selected column in their second remanent state to revert to their initial remanent state, and output circuit means electrically connected to each of said windings for determining whether or not upon passing said current in said opposite direction the individual cores of said selected column revert from its second to its initial bistable remanent state.

32. In a memory system comprising a plurality of storage devices having at least two stable states arranged in a coordinate array of rows and columns, circuit means in electrical energy exchange relationship with each of said storage devices for selectively causing said devices to assume a selected one of said stable states, read-out means for determining the state of each said device comprising a voltage source, a plurality of impedance means individually electrically connected serially therewith and with each said device to be read, said voltage source causing a current flow serially through each said impedance means and storage device to be read whose amplitude through each impedance means is dependent upon the state of the device to which such impedance means is electrically connected, and an output circuit coupled to each said impedance means and responsive to voltage changes across each said impedance means for indicating the state of the device to which said impedance means is electrically connected.

33. In a memory system comprising a plurality of storage devices having at least two stable states arranged in a coordinate array of rows and columns, circuit means in electrical energy exchange relationship with each of said storage devices for selectively causing said devices to assume a selected one of said stable states, read-out means for causing each said device to assume its initial bistable storage state including a plurality of impedance means individually electrically connected serially with each said device to be read, a voltage source for passing current flow serially through each said impedance means and device to be read, and an output circuit coupled to each of said impedance means and responsive to the amount of current flow through said storage devices for determining whether or not upon read-out each device switches from its second to its initial bistable storage state.

34. An information storage system comprising a plurality of storage elements operable to either an initial or a second storage state, said storage elements being arranged in an array of rows and columns, a like number of gating means forming a first plurality thereof each of which is individually connected electrically to one of said storage elements, read-in voltage means coupled to the gating means connected to the elements of each of said rows for selectively applying conditioning voltages to each of said row elements to condition the elements of the respective rows to acquire their initial or their second storage state, means for selectively applying a selection voltage to the elements of a predetermined one of the columns for establishing current flow through the gating means connected electrically to the elements of said one column and thus causing the storage elements in said column to acquire an initial or a second storage state in accordance with the conditioning voltages applied to the row elements by said read-in circuit means, read-out means including a second plurality of gating means each electrically connected to at least one of said storage elements, voltage means for establishing current flow through the storage elements of a selected column and the respective gating means of the second plurality connected electrically to the elements of said selected column for causing such elements to acquire their initial storage state, and output circuit means electrically connected to said respective gating means and to said storage elements of the selected column to produce an output signal in response to storage state changes in said elements caused by said read-out means.

35. An information storage system as set forth in claim 34 wherein each of said gating means comprises an asymmetrical conducting device.

36. In combination, a core of ferromagnetic material which exhibits a substantially rectangular hysteresis loop and is capable of assuming stable remanent states, only one electric winding having a plurality of terminals associated with said core, a plurality of sources of electric impulses connected, respectively, to at least two terminals of said winding for driving said core toward its opposite remanent states, and a load circuit connected to one of the terminals of said winding and arranged in parallel relationship to the winding associated with said core in regard to one of said sources of electric impulses.

References Cited in the file of this patent

UNITED STATES PATENTS

| | | |
|---|---|---|
| 2,510,061 | Branson | June 6, 1950 |
| 2,614,167 | Kamm | Oct. 14, 1952 |
| 2,696,600 | Serrell | Dec. 7, 1954 |
| 2,697,178 | Isborn | Dec. 14, 1954 |
| 2,734,187 | Rajchman | Feb. 7, 1956 |
| 2,736,880 | Forrester | Feb. 28, 1956 |

OTHER REFERENCES

RCA Review, "Static Magnetic Matrix Memory and Switching Circuits," by Jan Rajchman; pages 183–201; June 1952.

Journal of Applied Physics, Vol. 22, No. 1; "Digital Information Storage in Three Dimensions Using Magnetic Cores," by Forrester.

Bell Laboratories Record, "No. 5 Crossbar AMA Translator," by Dimond; pages 62–68; February 1951.

Progress Report (2) on the EDVAC, Moore, Scholl Engineering, Univ. of Pa., Feb. 13, 1947 (pages 4–21 to 4–23, drawing PY–O–164 and PY–O–165, total of five sheets).

"A Static Memory System for the Eniac," by I. I. Auerbach appearing in the "Proceedings Association Computing Machinery," May 1952. Pages 213–218.

"Static Magnetic Memory—Its Application to Computers and Controlling Systems" (Wang), Proceedings of the Association of Computing Machinery, May 2, 1952. Pages 207–212 (pages 208–209 and Fig. (*b*) relied on).